United States Patent [19]

Amano et al.

[11] Patent Number: 5,011,897

[45] Date of Patent: Apr. 30, 1991

[54] PROCESS FOR PREPARING VINYL CHLORIDE POLYMER USING HYDROXYPHENYL MONOMERS

[75] Inventors: Tadashi Amano, Ibaraki; Junichi Watanabe, Ageo, both of Japan

[73] Assignee: Shin-Etsu Chemical Co., Ltd., Tokyo, Japan

[21] Appl. No.: 348,511

[22] Filed: May 8, 1989

Related U.S. Application Data

[63] Continuation-in-part of Ser. No. 158,620, Feb. 22, 1988, abandoned.

[30] Foreign Application Priority Data

Mar. 6, 1987 [JP] Japan .................................. 62-51641

[51] Int. Cl.$^5$ .............................................. C08F 2/20
[52] U.S. Cl. .................................... 526/202; 526/200; 526/212
[58] Field of Search ................... 526/2, 200, 202, 209, 526/210, 212

[56] References Cited

U.S. PATENT DOCUMENTS

4,404,337  9/1983  Hata ...................................... 526/62
4,659,791  4/1987  Gardner ............................... 526/62

*Primary Examiner*—Christopher Henderson
*Attorney, Agent, or Firm*—Oblon, Spivak, McClelland, Maier & Neustadt

[57] ABSTRACT

A process for preparing a vinyl chloride containing polymer, comprising: suspension polymerizing vinyl chloride or a vinyl monomer mixture containing vinyl chloride in an aqueous medium; and adding an antioxidant dispersion essentially consisting of an antioxidant having a melting point of not lower than 30° C. and a suspending agent in water to the polymerization system, wherein said antioxidant dispersion has been heated once to a temperature not lower than the melting point of the antioxidant and then cooled, prior to the additon to the polymerization system. This process makes it possible to charge the antioxidant in an accurate amount by a mechanical means, and improve the quality of the manufactured polymer.

6 Claims, No Drawings

PROCESS FOR PREPARING VINYL CHLORIDE POLYMER USING HYDROXYPHENYL MONOMERS

This is a continuation-in-part application of Ser. No. 07/158,620, filed on Feb. 22, 1988 now abandoned.

BACKGROUND OF THE INVENTION

1. Field of the Invention

This invention relates to a process for preparing a vinyl chloride polymer through a suspension polymerization in an aqueous medium.

2. Description of the Prior Art

Conventionally, it is known to add an antioxidant to a polymerization system when preparing a vinyl chloride polymer, which is added for the purposes of (1) retarding or terminating the polymerization reaction, (2) homogeneously dispersing the antioxidant in a resulting vinyl chloride resin product to prevent the vinyl chloride resin from being deteriorated, etc. In any instances, the antioxidant is required to be homogeneously dispersed in the suspension polymerization system in order to bring the effect by the addition of the antioxidant into the maximum.

The antioxidant conventionally includes phenol antioxidants, amine antioxidants, sulfur antioxidants, phosphorous antioxidants, etc., which, however, are powdery in general, making it difficult to charge them in an accurate desired amount by way of a mechanical means such as pumps. In particular, the addition of the antioxidant during polymerization needs be carried out by pressing it into the polymerization which is kept in a pressurized state. It is difficult to press the powdery antioxidant in an accurate desired amount into the system, and it is also difficult to adjust the amount of the antioxidant to a predetermined amount.

For instance, U.S. Pat. No. 4,482,684 describes that the polymerization inhibitor disclosed therein can conveniently be incorporated into the polymerization reaction mixture in solid form at the beginning of the reaction (See column 3, lines 9-12), but this patent describes no method of charging the polymerization inhibitor in a polymerization system in the pressurized state. Moreover, the charging of the antioxidant in the said powdery state generally results in poor dispersion, thereby causing the drawbacks that the vinyl chloride polymer obtained exhibits increase in fish eyes and lowering of quality.

For this reason, it has been conventionally practiced to dissolve the antioxidant in a suitable organic solvent and add it as a solution. This method makes it possible to charge the antioxidant in the polymerization vessel by way of a mechanical means such as pumps, but has had the problems such that it becomes necessary to recover the solvent, the solvent remains in the resulting vinyl chloride resin to cause a poorness of the quality, the solvent mixes into the unreacted monomers to be recovered, and the COD in waste water increases in the instance of the suspension polymerization carried out in an aqueous medium.

As a method of charging the antioxidant into a polymerization kept in a pressurized state without using any organic solvent, U.S. Pat. No. 4,619,978 describes a method in which a mixture of an antioxidant and vinyl chloride monomer is heated to produce a pressure equal to the pressure in the polymerization vessel and thereafter charged into the vessel (See column 7, lines 1-14). This method has the disadvantage that the charging procedure is complicated. This method also has the drawback that if the antioxidant is charged at the end of polymerization, removal of unreacted monomers takes longer time after the polymerization.

Now, there has been recently proposed a process in which a powdery antioxidant is dispersed in water by using an emulsifying agent alone or using the emulsifying agent in combination with a suspending agent, to bring it into a state of an emulsion, which is then added in the polymerization system (Japanese Unexamined Pat. Publications No. 149608/1985 and No. 186547/1985).

The above process in which the antioxidant is added in the form of an emulsion by use of an emulsifying agent may lower the thermal stability and storage stability of the resulting vinyl chloride resin because of the inclusion of the emulsifying agent therein. It also has the problems such that, when added for the purpose of terminating the polymerization, the reaction tends to be terminated with insufficient effect, and, when added at the time the polymerization is completed, it may follow that the plasticizer absorption performance of the vinyl chloride resin becomes poor after the resin is subjected to heat treatment.

SUMMARY OF THE INVENTION

Now, an object of this invention is to provide a process for preparing a vinyl chloride polymer, that makes it possible to charge the antioxidant in an accurate desired amount by way of a mechanical means such as pumps, without using any solvent and any emulsifying agent either, and can sufficiently achieve the intended effect of adding the antioxidant to give a vinyl chloride resin of high quality.

This invention provides a process for preparing a vinyl chloride containing polymer, comprising:

suspension polymerizing vinyl chloride or a vinyl monomer mixture containing vinyl chloride in an aqueous medium; and adding an antioxidant dispersion essentially consisting of an antioxidant having a melting point of not lower than 30° C. and a suspending agent in water to the polymerization system, wherein said antioxidant dispersion has been heated once to a temperature not lower than the melting point of the antioxidant and then cooled, prior to the addition to the polymerization system.

This invention makes it possible to charge the antioxidant in an accurate desired amount to a polymerization system by way of a mechanical means such as a pump, and the charging procedure is simple and convenient. Since the antioxidant is dispersed readily and uniformly in the reaction mixture, the resulting vinyl chloride polymer can be of high quality, e.g., high storage stability, high thermal stability very few fish eyes and high plasticizer absorption performance. Also, the COD in waste water can be lowered, bringing about a great advantage in environmental sanitation.

DETAILED DESCRIPTION OF THE INVENTION

The antioxidant having a melting point of not less than 30° C. used in this invention may include, for example, phenol antioxidants, amine antioxidants, sulfur antioxidants, phosphorus antioxidants, etc., and particularly preferred are those having a melting point of not less than 30° C. and less than 100° C. Examples of the antioxidant having such a melting point include p-methoxyphenol, t-butylhydroxyanisole (BHA), n-octadecyl-3-(4'-hydroxy-3',5'-di-t-butylphenyl)propionate, 3,5-di-t-butyl-4-hydroxytoluene (BHT), triethylene glycol-bis[3-(3-t-butyl-5-methyl-4-hydroxyphenyl)propionate], 1,6-hexanediol-bis[3-(3,5-di-t-butyl(4-hydroxy-3,5-di-t-butylanilino)-1,3,5-triazine, 2,2-thiodiethylene-bis[3-(3,5-di-t-butyl-4-hydroxyphenyl)propionate], 2,2-thiobis(4-methyl-6-t-butylphenol), etc., but are by no means limited to these. These antioxidants may be alone, or may be in combination of two or more. Among the above exemplary antioxidants, particularly preferred ones include triethylene glycol-bis[3-3(-t-butyl-5-methyl-4-hydroxyphenyl)propionate], n-octadecyl-3-(4'-hydroxy-3', 5'-di-t-butylphenyl)propionate, t-butylhydroxylanisole, 3,5-di-t-butyl-4-hydroxytoluene, and 1,6-hexanediol-bis[3-(3,5-di-t-butyl-4-hydroxyphenyl)propionate].

In the process of this invention, the suspending agent used for the preparation of the antioxidant dispersion may include, for example, polyvinyl alcohol, methyl cellulose, hydroxypropyl methyl cellulose, hydroxyethyl cellulose, carboxymethyl cellulose and the like. Particularly preferred are water-soluble polyvinyl alcohols having a saponification degree of 60 to 98 mole % and a polymerization degree of 600 to 3,000. This is because those having a saponification degree of less than 60 mole % can be dissolved in water with difficulty, and perfectly saponified polyvinyl alcohols having a saponification degree of more than 98 mole % tend to be gelled during storage. Polyethylene oxide, sodium polyacrylate, alginic acid, etc. may also be used in combination.

The antioxidant dispersion used in this invention can be prepared by, for example, feeding water to a dissolving tank equipped with a jacket for heating or cooling and a stirrer, adding the suspending agent and the powdery antioxidant, and dispersing them with stirring. In this occasion, it is necessary, after the antioxidant has been dispersed, to raise the temperature to a temperature not lower than the melting point of the antioxidant by heating with the jacket, followed by cooling when the dispersion has been made sufficiently homogeneous. By virtue of this heating operation, the antioxidant dispersion can be obtained as an aqueous dispersion in which the antioxidant has been homogeneously dispersed.

The absence of the above heating operation results not only in lowering of the antioxidant dispersion stability but also in lowering of plasticizer absorption and initial color-free property as well as in increase in fish eyes of the manufactured polymer. The reason for this is presumably that the antioxidant is not uniformly dispersed in the resulting aqueous dispersion and therefore is not taken up by the resulting vinyl chloride polymer particles.

There is no particular limitation in the dispersing means used in the preparation of the above dispersion, and the stirring blade may have a general form such as a paddle, a propeller, a turbine, a Brumagin type, a Pfaudler type, etc. If necessary, it is also possible to use a homogenizer in combination, or there may be used a pressing high pressure pump, a colloid mill, high pressure ejection from a nozzle or orifice, ultrasonic wave, etc.

Particles of the antioxidant dispersed in the dispersion may preferably have a particle size of 20 μm or less from the viewpoint of storage stability, and be in concentration of about 5 to 50 % by weight.

There is also no particular limitation in the concentration of the suspending agent, which may be suitably selected taking account of the storage stability and the readiness of being fed by a pump (in other words, the viscosity after formed as a dispersion), but usually may preferably be about 1 to 30 %.

There is no particular limitation in the water used in preparing the dispersion, but preferred is to use distilled water or deionized water.

The above antioxidant dispersion can be added at any time, i.e., before initiating the polymerization, during the polymerization or after completing the polymerization, depending on the purpose of the addition. It can also be added in two or more portions. Usually, the antioxidant dispersion may be added to the polymerization system before the initiation of polymerization for the purpose of controlling polymerization and thereby reducing fish eyes in resulting products, at the end of polymerization for the purpose of terminating the polymerization, and after completion of polymerization for the purpose of preventing degradation of resulting products. The antioxidant dispersion can be added once or more times to achieve one or more of the above purposes. In view of the readiness in operation, it may preferably be fed by means of a pump. The antioxidant dispersion may preferably be added in an amount (in terms of the antioxidant) of 0.001 to 1.0 % by weight based on the amount of the monomers to be fed. The amount less than 0.001 % makes it impossible to prevent the vinyl chloride resin from being deteriorated, and the amount more than 1.0 % can bring about no expectation of moreover improving the antioxidizing effect, resulting in not only an economical disadvantage but also an increase in COD in waste water.

The process of this invention can be applied in the aqueous suspension polymerization of any of conventionally known vinyl chloride monomer or vinyl monomer mixtures containing vinyl chloride monomer.

The vinyl monomers other than vinyl chloride may include, for example, α-olefins such as ethylene, propylene, 1-butene, 1-pentene, 1-hexene, 1-heptene, 1-octene, 1-nonene, 1-decene, 1-undecene, 1-dodecene, 1-tridecene and 1-tetradecene, acrylic acid and esters thereof, methacrylic acid and esters thereof, maleic acid and esters thereof, vinyl compounds such as vinyl acetate, vinyl propionate and alkyl vinyl ethers, and a mixture of these.

In the aqueous suspension polymerization, there is generally used 80 to 300 parts by weight of water based on 100 parts by weight of the monomers, and the polymerization is carried out usually at a temperature of 35° to 70° C.

Usable polymerization initiators may include, for example, peroxydicarbonates such as diisopropyl peroxydicarbonate, dioctyl peroxydicarbonate, dilauryl peroxydicarbonate, dicetyl peroxydicarbonate, di-tert.-butyl peroxydicarbonate, di(2-ethoxyethyl)peroxydicarbonate, di(2-methoxypropyl)peroxydicarbonate, dibenzyl peroxydicarbonate, dicyclohexyl peroxydicarbonate and di-tert.-butyl cyclohexyl peroxydicarbonate; azo compounds such as 2,2'-azobis-2,4-dimethylvaleronitrile and 2,2'-azobis-4-methoxy-2,4-dimethylvaleronitrile; peroxides such as tert.-butyl peroxyneodecanate, α-cumyl peroxyneodecanate, tert.-octyl peroxyneodecanate, tert.-butyl peroxypivalate, α-cumyl peroxypivalate, amyl proxypivalate, di-tert.- butyl oxalate and isobutyryl peroxide. These may be used in combination in order to make uniform the polymerization reaction rate.

Dispersants used in the aqueous suspension polymerization may include, for example, polyvinyl alcohol, cellulose derivatives, a maleic anhydride/styrene copolymer, a maleic anhydride/methyl vinyl ether copolymer, gelatin, etc. Optionally, there may further be appropriately added polymerization regulators, chain transfer agents, gelation improvers, antistatic agents, pH adjustors, etc.

EXAMPLES

This invention will be described below in greater detail by way of Examples.

Example 1

(1) Preparation of aqueous antioxidant dispersion:

In a beaker of an internal volume of 300 cc, 210 g of deionized water, 15 g of polyvinyl alcohol having a saponification degree of 79.5 % and an average polymerization degree of 2,550 and 25 g of triethylene glycol-bis[3-(3-t-butyl-5-methyl-4-hydroxyphenyl)propionate] (m.p.: 80° C.) were charged, and heated to 82° C. with stirring, followed by cooling at the time they were homogeneously dispersed to obtain a homogeneous aqueous antioxidant dispersion. (2) Preparation of a vinyl chloride polymer by suspension polymerization:

In a polymerization vessel made of stainless steel, having an internal volume of 100 lit., 60 kg of deionized water, 25 g of partially saponified polyvinyl alcohol and 15 g of di-2-ethylhexyl peroxydicarbonate were charged. After the inside of the vessel was evacuated up to 40 mmHg, 30 kg of vinyl chloride monomer were charged, and heated to 57° C. with stirring, to carry out polymerization while keeping this temperature. At the time the pressure inside the vessel reached 6.5 kg/cm$^2$G, 150 g of the aqueous antioxidant dispersion prepared in (1) were pressed into the vessel by operating a plunger pump for 10 minutes. Thereafter, while recovering the unreacted monomers, the temperature inside the vessel was raised, and maintained for 30 minutes at 80° C., followed by cooling. The resulting polymer slurry was dewatered and dried.

Example 2

(1) Preparation of aqueous antioxidant dispersion:

Example 1-(1) was repeated to prepare an aqueous dispersion, except that polyvinyl alcohol was used in an amount of 10 g and triethylene glycol-bis [3-(3-t-butyl-5-methyl-4-hydroxyphenyl)propionate] was used in an amount of 75 g.

(2) Preparation of vinyl chloride polymer:

Example 1-(2) was repeated to prepare a vinyl chloride polymer, except that used as an aqueous dispersion was 50 g of the one prepared in the above (1).

Example 3

(1) Preparation of aqueous antioxidant dispersion:

Example 1-(1) was repeated to prepare an aqueous dispersion, except that 35 g of polyvinyl alcohol having a saponification degree of 72.5 % and an average polymerization degree of 780 were used in place of 15 g of polyvinyl alcohol having a saponification degree of 79.5 % and an average polymerization degree of 2,550.

(2) Preparation of vinyl chloride polymer:

Example 1-(2) was repeated to prepare a vinyl chloride polymer, except that used as an aqueous dispersion was 162 g of the one prepared in the above (1).

Comparative Example 1

(1) Preparation of antioxidant solution:

In 100 g of methanol, 15 g of triethylene glycol-bis[3-(3-t-butyl-5-methyl-4-hydroxyphenyl)propionate] were dissolved.

(2) Preparation of vinyl chloride polymer:

Example 1-(2) was repeated to prepare a vinyl chloride polymer, except that the above methanol solution was used in place of the aqueous dispersion.

Comparative Example 2

(1) Preparation of aqueous antioxidant dispersion:

In a ball mill, 40 parts (by weight) of triethylene glycol-bis[3-(3-t-butyl-5-methyl-4-hydroxyphenyl)propionate], 57 parts of deionized water and 3 parts of sorbitan monolaurate were charged and ground to dispersion to prepare a homogeneous aqueous dispersion.

(2) Preparation of vinyl chloride polymer:

Example 1-(2) was repeated to prepare a vinyl chloride polymer, except that used as an aqueous dispersion was 37.5 g of the dispersion prepared in the above (1).

Comparative Example 3

(1) Preparation of antioxidant solution:

Example 1-(1) was repeated to prepare an aqueous antioxidant dispersion, except that the mixture of deionized water, the polyvinyl alcohol and triethylene glycol-bis[3-(3-t-butyl-5-methyl-4-hydroxphenyl)propionate]was not heated to 82° C. but only stirred at 20° C.

(2) Preparation of vinyl chloride polymer:

The preparation of a vinyl chloride polymer was attempted by repeating the procedure of Example 1-(2), except that the aqueous antioxidant dispersion prepared in the above (1) of this Comparative Example was used as an aqueous antioxidant dispersion. However, the working of the plunger pump stopped in one minute from its start and therefore the feeding of the aqueous antioxidant dispersion also stopped. Only about 15 g of the aqueous antioxidant dispersion was fed.

Comparative Example 4

(1) The procedure of Example 1-(2) was repeated to prepare a vinyl chloride polymer, except that it was tried to charge 15 g of powdery triethylene glycolbis[3-(3-t-butyl-5-methyl-4-hydroxyphenyl)-propionate] as it is by means of a charge line connected to the inside of the polymerization vessel. The charge line is constructed such that the powdery antioxidant may be placed in its inside and then may be charged into the polymerization vessel by making the pressure in its inside equal to the pressure in the polymerization vessel. However, it was impossible to charge the whole 15 g of the antioxidant, but only 10 g of the antioxidant was charged and the rest remained on the inner surface of the line.

Comparative Example 5

The procedure of Comparative Example 4 was repeated to prepare a vinyl chloride polymer, except that 15 g of the powdery antioxidant was successfully charged by increasing the antioxidant placed in the charge line.

The size of the dispersed particles, viscosity and storage stability of the antioxidant dispersions prepared in the above Examples and Comparative Examples were measured. The plasticizer absorption performance and initial color property of the resulting vinyl chloride polymers were measured. Also measured was COD in the waste water after polymerization. Results are shown in Table 1. The storage stability of the antioxidant dispersions and the initial color-free property of the vinyl chloride polymers were evaluated based on the standards shown below. The plasticizer absorption performance was evaluated by the method described below.

Storage stability of antioxidant dispersions:
A: No settling occurs even after leaving for 24 hours.
B: Settling occurs after leaving for 6 hours or more.
C: Settling occurs within 1 hour.

Initial color property of vinyl chloride polymers:
Evaluation was made in comparison with a vinyl chloride polymer prepared in the same manner as in Example 1-(2) except that the aqueous dispersion of the antioxidant was not introduced.
A: Superior
B: Substantially equal
C: Poorer Plasticizer absorption performance:
400 g of a vinyl chloride polymer was placed and heated with stirring for four minutes in the container kept at 80° C., having a stirrer of a Brabender Plastograph. Thereafter, 200 g of DOP was added. The time was measured which was taken from the addition of the DOP until the vinyl chloride polymer powder dried.

triethylene glycol-bis[3-(3-t-butyl-5-methyl-4-hydroxyphenyl)-propionate], n-oxtadecyl-3-(4'-hydroxy- 3',5'-di-t-butylphenyl)propionate, t-butylhydroxyanisole, 3,5-di-t-butyl-4-hydroxytolune, and 1,6-hexanediol-bis[3-(3,5-di-t-butyl-4-hydroxyphenyl)propionate] and a suspending agent which is a water-soluble polyvinyl alcohol having a saponification degree of 60 to 98% and a polymerization degree of 600 to 3000 in water to the polymerization system, wherein said antioxidant dispersion has been heated once to a temperature not lower than the melting point of the antioxidant and then cooled, prior to addition of the dispersion to the polymerization system.

2. The process according to claim 1, the antioxidant has a melting point of not less than 30° C. and less than 100° C.

3. The process according to claim 1, wherein said antioxidant dispersion is added to the system in an amount of 0.001 to 1.0% by weight in terms of the antioxidant based on the amount of the monomers charged.

4. The process according to claim 1, wherein said antioxidant dispersion is added to the polymerization system at least once before the initiation of polymerization, during polymerization or after completion of the polymerization.

5. The process according to claim 1, wherein the

TABLE 1

| | Example 1 | Example 2 | Example 3 | Comparative Example 1 | Comparative Example 2 | Comparative Example 3 | Comparative Example 5 |
|---|---|---|---|---|---|---|---|
| Aqueous antioxidant dispersion | | | | | | | |
| Average particle size (μm) | 5 | 7 | 6 | — | 5 | 30 | 32 |
| Viscosity (cP), 25° C. | 340 | 300 | 200 | — | 80 | 150 | — |
| Storage stability | A | A | A | — | B | C | — |
| Quality of vinyl chloride polymer | | | | | | | |
| Plasticizer absorption performance | 12.4 | 12.6 | 12.8 | 13.0 | 18.7 | 16.5 | 14.2 |
| Initial color-free property | | | | | | | |
| COD in waste water (ppm) | A<br>120 | A<br>80 | A<br>100 | A<br>1000 | C<br>80 | C<br>90 | B<br>80 |

We claim:

1. A process for preparing a vinyl chloride containing polymer, comprising:
suspension polymerizing vinyl chloride or a vinyl monomer mixture containing vinyl chloride in an aqueous medium; and
adding an antioxidant dispersion consisting essentially of from about 5 to 50% by weight of an antioxidant having a melting point of not lower than 30° C. and selected from the group consisting of vinyl monomer to be polymerized is a monomer mixture of vinyl chloride and a vinyl monomer selected from the group consisting of α-olefins, acrylic acid, acrylate, methacrylic acid, methacrylates, maleic acid, maleates, vinyl acetate, vinyl propionate and alkyl vinyl esters.

6. The process according to claim 1, wherein said antioxidant dispersion is added to the polymerization system by means of a pump.

* * * * *